(12) United States Patent
Kärger et al.

(10) Patent No.: US 6,520,897 B1
(45) Date of Patent: Feb. 18, 2003

(54) RESILIENT ROLL AND PROCESS FOR PRODUCING SUCH A ROLL

(75) Inventors: Jens Christian Kärger, Winterthur (CH); Albert Maria Vodermayer, Dietlikon (CH)

(73) Assignee: Voith Sulzer Papiertechnik Patent GmbH, Heidenheim (DE)

( * ) Notice: Subject to any disclaimer, the term of this patent is extended or adjusted under 35 U.S.C. 154(b) by 0 days.

(21) Appl. No.: 09/583,726

(22) Filed: May 31, 2000

(30) Foreign Application Priority Data

Jun. 2, 1999 (DE) .......................... 199 25 418

(51) Int. Cl.[7] ................................ B23P 15/00
(52) U.S. Cl. ..................... 492/54; 492/56; 492/58; 492/59
(58) Field of Search ............... 492/54, 56, 59, 492/58

(56) References Cited

U.S. PATENT DOCUMENTS

| | | | |
|---|---|---|---|
| 3,807,013 A | | 4/1974 | Sukenik |
| 3,852,862 A | | 12/1974 | Sukenik |
| 4,576,845 A | | 3/1986 | Krotchko |
| 5,091,027 A | | 2/1992 | Watanabe |
| 5,322,970 A | * | 6/1994 | Behe et al. |
| 5,384,627 A | * | 1/1995 | Behe et al. ................. 355/247 |
| 5,520,601 A | * | 5/1996 | Ghosh et al. ................. 492/58 |
| 5,682,783 A | * | 11/1997 | Creamer et al. ............... 72/182 |
| 5,830,537 A | * | 11/1998 | Telama |
| 6,029,571 A | * | 2/2000 | Johner et al. |
| 6,049,692 A | * | 4/2000 | Hwang |
| 6,200,248 B1 | * | 3/2001 | Vestola et al. ................. 492/54 |
| 6,290,633 B1 | * | 9/2001 | Sondergeld |
| 6,290,834 B1 | * | 9/2001 | Pearsall |
| 2001/0024723 A1 | * | 9/2001 | Vestola et al. ................. 492/51 |

FOREIGN PATENT DOCUMENTS

| | | |
|---|---|---|
| DE | 19529711 | 2/1997 |
| WO | 99/63154 | 12/1999 |

* cited by examiner

*Primary Examiner*—I Cuda Rosenbaum
(74) *Attorney, Agent, or Firm*—Greenblum & Bernstein, P.L.C.

(57) ABSTRACT

Roll and process for producing roll including a hard roll core, and a resilient covering layer, including a matrix material, located on an outer side of the hard roll core. The matrix material includes a soft metal. The process includes producing a matrix material comprising a soft metal, and applying the soft metal matrix material onto an outer side of the hard roll core, thereby forming the resilient covering layer.

18 Claims, 1 Drawing Sheet

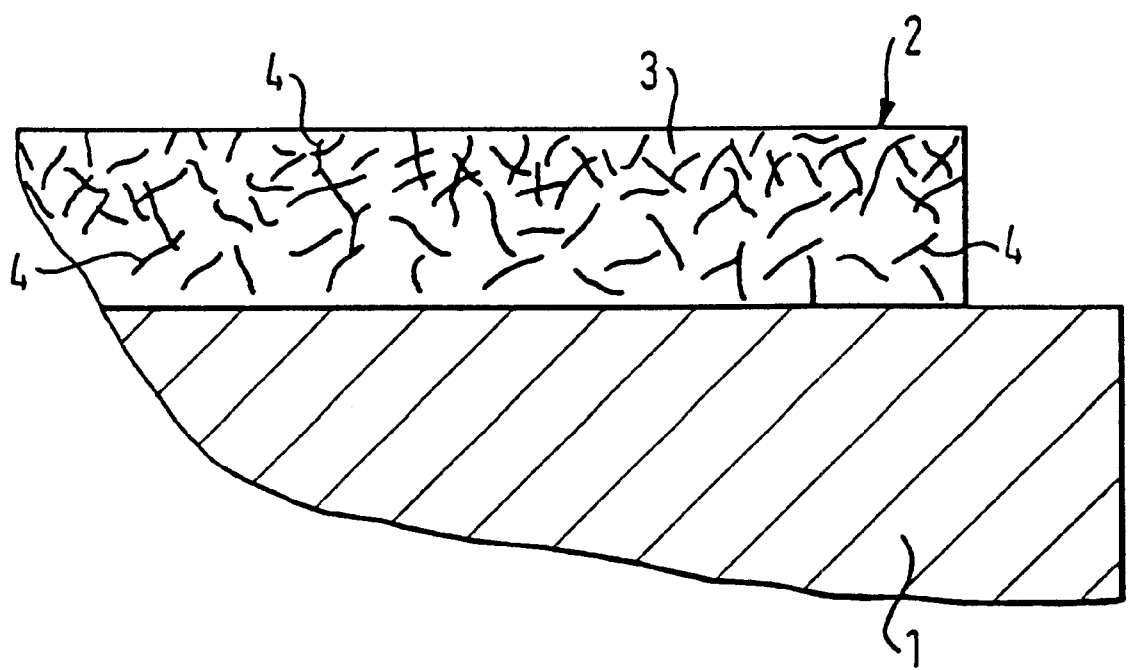

RESILIENT ROLL AND PROCESS FOR PRODUCING SUCH A ROLL

The present application claims priority under 35 U.S.C. §119 of German Patent Application No. 199 25 418.4, filed on Jun. 2, 1999, the disclosure of which is expressly incorporated by reference herein in its entirety.

BACKGROUND OF THE INVENTION

1. Field of the Invention

The present invention relates to a roll, e.g., for smoothing paper webs, having a hard roll core which includes, e.g., metal, and which is provided on its outer side with a resilient covering layer including a resilient matrix material and fillers embedded in the matrix material. Furthermore, the invention is directed to a process for producing such a roll.

2. Background of the Invention

Resilient rolls of this type are used, for example, in the calendering of paper webs. Here, in each case an elastic roll together with a hard roll forms a press nip, through which the paper web to be processed is led. While the hard roll has a very smooth surface, made of, e.g., steel or hard cast iron, and is responsible for smoothing that side of the paper web which faces it, the resilient roll acting on the opposite side of the paper web has the effect of evening and compacting the paper web in the press nip. The rolls have lengths on the order of approximately 3 to 12 m and diameters on the order of approximately 450 to 1500 mm. They withstand line forces up to approximately 600 N/mm and compressive stresses up to approximately 130 N/mm².

Since the tendency in paper manufacture is for calendering to be carried out on-line, that is to say the paper web leaving the papermaking machine or coating machine is led immediately through the paper smoothing device (calender), higher requirements than hitherto are placed on the rolls of the smoothing device, in particular in relation to their temperature resistance. The high transport speeds of the paper web, necessitated by on-line operation, and the associated high rotational speeds of the calender rolls, increase the nip frequency of the rolls, i.e., the frequency with which the cover is compressed and relieved again, which in turn leads to increased roll temperatures. These high temperatures, produced during on-line operation, lead to problems which, in the case of known resilient rolls, can lead to the destruction of the synthetic covering. On the one hand, in the case of known synthetic coverings, maximum temperature differences of about 20° C. over the width of the roll are permissible and, on the other hand, the polymers normally used for the coating have a significantly higher coefficient of thermal expansion than the steel rolls or hard cast rolls normally used, so that, as a result of an increase in the temperature, high axial stresses occur between the steel roll or hard cast roll and the synthetic coating connected to it.

As a result of these high stresses, associated with heating locations, which occur in particular at certain points, within the synthetic coating, so-called hot spots can occur, at which separation or even bursting of the synthetic layer takes place.

These hot spots occur in particular when, in addition to the mechanical stresses and the relatively high temperature, there are crystallization points in the form of, e.g., faulty adhesive bonds, deposits or above-average indentations in the resilient covering, e.g., as a result of creases in or foreign bodies on the paper web. In these cases, the temperature at these crystallization points can rise from normally approximately 80° C. to 90° C. to more than approximately 150° C., which results in the aforementioned destruction of the synthetic layer.

In order to control the characteristics of the resilient covering layer, powdered fillers and/or fibers are embedded in the matrix material. The physical characteristics of the resilient covering layer are dominated or influenced by the quantity and physical characteristics of these fillers or the fibers.

SUMMARY OF THE INVENTION

The present invention provides a process for producing a resilient roll of the type mentioned above, as well as the produced resilient roll, in which the risk of the occurrence of hot spots is reduced.

According to the invention, the roll is similar in general to the above-described roll and also has a matrix material that includes a soft metal. A corresponding process according to the invention includes applying a soft metal to the roll core to produce the covering layer.

As opposed to the covering layers of known smoothing rolls of calendars, the covering layer of the instant invention includes a soft metal, such as zirconium, not plastic. Because of the high thermal conductivity of metal, a roll constructed in accordance with the invention can exhibit a very rapid dissipation of heat from overheating occurring within the covering layer, so that the occurrence of hot spots and the associated destruction of the covering layer are reliably prevented.

Furthermore, because both the roll core and the covering layer are produced from metal and thus have essentially a same coefficient of thermal expansion, no longitudinal stresses or no significant longitudinal stresses occur between the roll core and the metallic covering layer. In this manner, the occurrence of hot spots and separation or bursting of the covering layer is avoided.

The necessary resilience of the covering layer is ensured by the suitable selection of a correspondingly soft metal. It is advantageous if, in addition, the fillers embedded in the metal forming the matrix material have a higher resilience than the metal. In this manner, the resilience of the covering layer, which is composed of the respective resilience of the metal and fillers, is increased. In contrast to the known rolls, the fillers incorporated in the matrix material are not provided to increase stiffness of the covering layer, but, rather, to reduce it. Since, according to the present invention, the heat occurring within the covering layer during operation thus dissipated directly via the matrix material and not via the fillers, and since the matrix material has an uninterrupted thermal conductivity over the entire extent of the covering layer, the heat from undesired overheating points can be dissipated rapidly and reliably, both radially to the roll core and axially.

According to a further advantageous embodiment of the invention, the metal forming the matrix material is a metal which melts at low temperatures, e.g., at temperatures below about 600° C., and preferably at about 480° C. or less. The use of a low-melting-point metal simplifies the production of a roll constructed in accordance with the invention, since the material of the roll core and the material of the fillers to be incorporated in the matrix material must have a lower heat resistance than that which would be required if a metal melting at high temperatures were used.

The fillers can preferably include aramide or the like and/or be formed as synthetic particles, e.g., as fibers or rovings. In the case of being formed as fibers, at least some, e.g., a predominant proportion, of the fibers can be aligned in the axial and/or radial direction or distributed randomly. In this regard, the stiffness or resilience of the covering layer can be adjusted depending upon the alignment of the fibers.

The fibers can be arranged in one or more fibre layers, e.g., arranged concentrically, and it is also possible for further fillers, in particular in the form of fibers or powder, to be arranged in the metal forming the matrix material, in order to exert an influence on the physical characteristics of the covering layer in a desired way.

In order to produce a roll constructed in accordance with the invention, the roll core can be coated with the metal. For example, the metal can be applied (evaporated on, sprayed on or the like) to the roll core in the liquid state. It is also possible, in order to produce the covering layer, for at least one fibre bundle having of a large number of metal fibers or metal-coated fibers to be wound onto the roll core, e.g., a number of fibre layers over one another. In this case, the metal fibers or the metal coating of the fibers can still largely be in the liquid state at their surface, so that following the winding operation there is a unified metallic covering layer on the roll core. However, in principle it is also possible for the metal fibers or metal-coated fibers wound on in the solid state to be heated after the winding operation to such an extent that at least their surface changes to a liquid state, as a result of which the unified metallic covering layer is produced. In principle, it is also possible to wind the fibers onto the roll core without a metallic coating and, after winding has been carried out, to coat them with he metal or to apply the metal to them.

Should the fibers be wound onto the roll with an essentially liquid metal layer, it is advantageous to coat the fibers or the fiber bundles with the metal before winding them onto the roll core, in particular by drawing them through a bath of metal.

After the production and drying of the metallic ring layer, the surface of this covering layer is advantageously ground, so that the roll is given an extremely smooth surface.

The present invention is directed to a roll including a hard roll core, and a resilient covering layer, including a matrix material, located on an outer side of the hard roll core. The matrix material includes a soft metal.

In accordance with a feature of the invention, the roll can be adapted for smoothing paper webs, the hard roll core can include metal, and the resilient covering layer can also include a filler embedded in the matrix material.

According to another feature of the present invention, the metal may melt at temperatures below about 600° C., and preferably melts at temperatures of about 480° C. or less.

In accordance with still another feature of the instant invention, the metal can be zirconium.

The resilient covering layer can also include fillers embedded in the matrix material that can have a higher resilience than the metal forming the matrix material. Further, a thermal conductivity of the metal forming the matrix material can be higher than a thermal conductivity of the fillers.

Moreover, a coefficient of thermal expansion of the metal forming the matrix material may be essentially as high as a coefficient of thermal expansion of the roll core.

According to still another feature of the present invention, the resilient covering layer can also fillers embedded in the matrix material, and the filler can include aramide. The fillers can be formed as synthetic particles. Further, the synthetic particles can include at least one of fibers and rovings.

At least some of the fibers may be aligned in an axial direction. Further, a predominant portion of the fibers can be aligned in the axial direction.

At least some of the fibers may be aligned in a radial direction. Further, a predominant portion of the fibers can be aligned in the radial direction.

At least some of the fibers can be aligned randomly.

In accordance with a further feature of the invention, the fibers can be arranged one of in one fibre layer and in radially successive fibre layers.

According to a still further feature of the present invention, the resilient covering layer can also include additional fillers including at least one of fibers and powder arranged in the metal forming the matrix material. The additional fillers can include at least one of quartz, PTFE, carbon fibers, and glass fibers.

The present invention is also directed to a process for producing a roll having a hard roll core and a resilient covering layer. The process includes producing a matrix material comprising a soft metal, and applying the soft metal matrix material onto an outer side of the hard roll core, thereby forming the resilient covering layer.

According to a feature of the present invention, the hard roll core can be metal, and the resilient covering layer can also include fillers embedded in the matrix material.

In accordance with another feature of the invention, the hard roll core can be coated with the soft metal matrix.

According to still another feature of the present invention, the soft metal matrix can be applied to the roll core in a liquid state.

Further, the resilient covering layer can include at least one fibre bundle having of a large number of one of metal fibers and metal-coated fibers wound onto the hard roll core. A number of fibre layers can be wound over one another. Further, the fiber bundle can be formed by at least one of at least one fibre roving and at least one fibre non-woven. A roving can include a large number of fibers of identical type lying beside one another.

Moreover, before being wound onto the roll core, the process can further include coating one of the fiber bundle and individual fibers of the fiber bundle with metal. The one of the fiber bundle and the individual fibers of the fiber bundle can be coated in a bath of metal.

According to a further feature of the present invention, the process further includes winding an essentially dry one of the fibre bundle and individual fibers of the fiber bundle onto the roll core, and, during or after the winding operation, one of coating and applying the wound fibers with the soft metal matrix.

In accordance with a still further feature of the invention, the fibers may be at least one of glass and carbon fibers.

According to yet another feature of the instant invention, after applying the soft metal matrix onto the hard roll core, the process can further include grinding a surface of the resilient covering layer.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

The FIGURE illustrates a part of the roll in accordance with an exemplary embodiment of the instant invention.

DETAILED DESCRIPTION OF THE PRESENT INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

The FIGURE illustrates a partial section of a roll core 1, e.g., steel or hard cast iron, which is provided on its outer side with a resilient covering layer 2.

Covering layer 2 comprises a soft metal 3, e.g., zirconium, in which a large number of fibers 4 are embedded. Fibers 4 can be formed as soft synthetic fibers, e.g., aramide. According to the exemplary embodiment, a frequency of fibers 4 increases radially outwardly. Since the fibers 4 have a higher resilience than metal 3, resilient covering layer 2 has a higher resilience in a radially outer region than in a radially inner region. In principle, however, it is also possible to distribute fibers 4 uniformly over covering layer 2 or, if desired, to increase the frequency of fibers 4 radially inwardly.

Since the matrix material of covering layer 2 is formed of metal and the matrix material has continuous, uninterrupted webs of material in all directions, i.e., in the radial, axial and circumferential directions around fibers 4, there is a very good heat conduction path in all directions from each location within covering layer 2. For example, in the event of heating at a point within covering layer 2, e.g., due to increased flexing work during operation, the heat produced is dissipated very rapidly from the point of production. In this manner, such a dissipation can take place both in the axially and radially to roll core 1, whereupon the heat is carried away radially inwardly or axially to the side by roll core 1.

The occurrence of hot spots is reliably prevented by the high thermal conductivity of the covering layer consisting of metal.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE SYMBOLS

1 Roll core
2 Resilient covering layer
3 Soft metal
4 Fibers

What is claimed is:

1. A roll comprising:

a hard roll core; and a resilient covering layer, comprising a matrix material, located on an outer side of said hard roll core, wherein said matrix material comprises a soft metal and said resilient covering layer further comprises fillers embedded in the matrix material that have a higher resilience than said metal forming said matrix material.

2. The roll in accordance with claim 1, wherein said roll is adapted for smoothing paper webs, wherein said hard roll core comprises metal, and wherein said resilient covering layer further comprises filler embedded in said matrix material.

3. The roll in accordance with claim 1, wherein said metal melts at temperatures below about 600° C.

4. The roll in accordance with claim 1, wherein said metal melts at temperatures of about 480° C. or less.

5. The roll in accordance with claim 1, wherein said metal is zirconium.

6. The roll in accordance with claim 1, wherein a thermal conductivity of said metal forming said matrix material is higher than a thermal conductivity of said fillers.

7. The roll in accordance with claim 1, wherein a coefficient of thermal expansion of said metal forming said matrix material is essentially as high as a coefficient of thermal expansion of said roll core.

8. The roll in accordance with claim 1, wherein said resilient covering layer further comprises fillers embedded in said matrix material, said filler comprising aramide.

9. The roll in accordance with claim 8, wherein said fillers are formed as synthetic particles.

10. The roll in accordance with claim 9, wherein said synthetic particles comprise at least one of fibers and rovings.

11. The roll in accordance with claim 9, wherein at least some of said fibers are aligned in an axial direction.

12. The roll in accordance with claim 11, wherein a predominant portion of said fibers is aligned in the axial direction.

13. The roll in accordance with claim 9, wherein that at least some of said fibers are aligned in a radial direction.

14. The roll in accordance with claim 13, wherein a predominant portion of said fibers is aligned in the radial direction.

15. The roll in accordance with claim 9, wherein at least some of said fibers are aligned randomly.

16. The roll in accordance with claim 9, wherein said fibers are arranged one of in one fibre layer and in radially successive fibre layers.

17. The roll in accordance with claim 1, wherein said resilient covering layer further comprises additional fillers comprising at least one of fibers and powder arranged in said metal forming said matrix material.

18. The roll in accordance with claim 17, wherein said additional fillers comprise at least one of quartz, PTFE, carbon fibers, and glass fibers.

* * * * *